Feb. 10, 1970     W. B. HANSEL     3,494,180

VIBRATION SENSOR

Filed Oct. 17, 1967

INVENTOR:
WILLIAM B. HANSEL
BY Donald R. Johnson
ATTY.

United States Patent Office 3,494,180
Patented Feb. 10, 1970

3,494,180
VIBRATION SENSOR
William B. Hansel, Media, Pa., assignor to Sun Oil Company, Philadelphia, Pa., a corporation of New Jersey
Filed Oct. 17, 1967, Ser. No. 675,975
Int. Cl. G01n 9/18
U.S. Cl. 73—71.4         6 Claims

ABSTRACT OF THE DISCLOSURE

A transducer for sensing low frequency vibrations comprises a piezoelectric crystal secured in a housing by means of a vibration-transmitting coupling which attenuates high frequency vibrations. A mechanical frequency converter, which converts low frequency vibrations to higher frequency vibrations, is coupled to the crystal. Means are provided to removably attach the housing to a body carrying the vibrations to be sensed, and the crystal electrical output is fed to the input of an amplifier which has a suitable meter connected to its output.

---

This invention relates to a vibration sensor (electromechanical transducer) for sensing mechanical vibrations, such as those resulting from rotational wheel unbalance of a motor vehicle.

When the wheel of a motor vehicle are driven by a fixed testing machine such as a set of driven rollers (or a wheel spinner), out-of-balance conditions of the vehicle front wheels result in the production of low frequency mechanical vibrations which are transmitted to the (stationary) vehicle frame. It is desired to detect such vibrations, so that the out-of-balance condition may be recognized.

An object of this invention is to provide a novel transducer for detecting mechanical vibrations.

Another object is to provide an electromechanical transducer for detecting low frequency mechanical vibrations.

A further object is to provide an electromechanical transducer of the foregoing character which is simple and cheap, and yet has high sensitivity.

A still further object is to provide a wheel unbalance detector, for use with motor vehicles, which is small and light and therefore highly portable.

The objects of this invention are accomplished, briefly, in the following manner: A housing containing an electromechanical transducer is attached to some point of the motor vehicle frame near the front wheels thereof, by means of a magnet secured to this housing. The transducer inside the housing comprises a piezoelectric crystal, secured to the housing through a coupling which damps out high frequency vibrations (noise). A mechanical frequency converter, which converts low frequency vibrations to higher frequency vibrations, is tightly coupled to the crystal but is independent of the housing. The electrical output of the crystal is connected to the input of a small, light-weight amplifier which drives a suitable meter.

Figure 1:
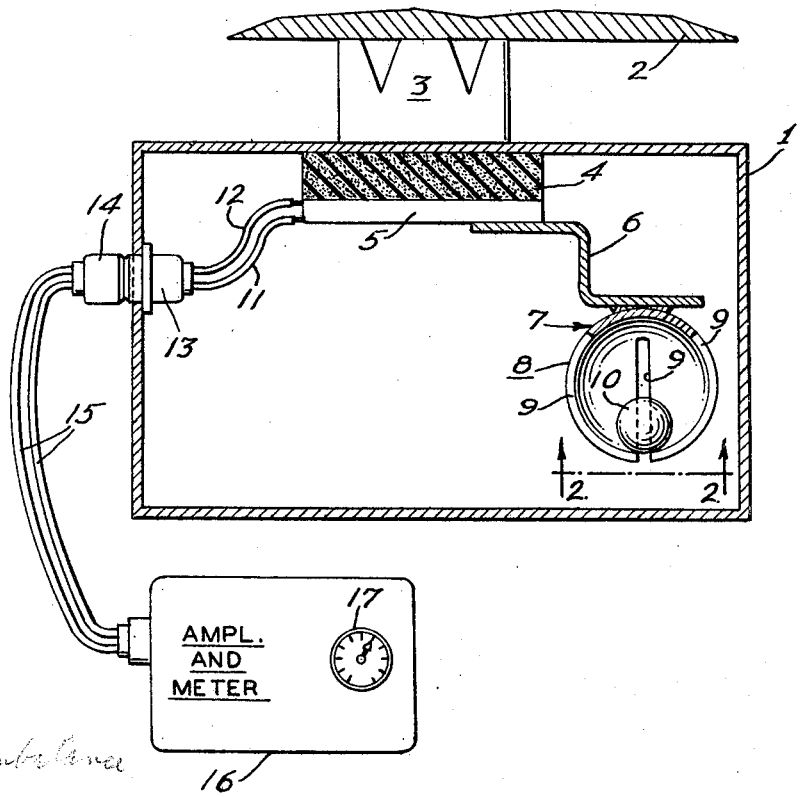
Figure 2:
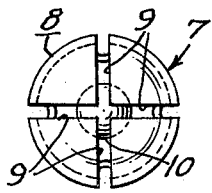

A detailed description of the invention follows, taken in conjunction with the accompanying drawing, wherein:

FIG. 1 is a combined structural and schematic illustration of a wheel unbalance detecting and indicating system employing the vibration sensor of this invention, the sensor itself being illustrated in cross-section; and FIG. 2 is a view looking in the direction 2—2 in FIG 1, illustrating a detail.

Now referring to the drawing, a housing 1 which contains the principal operating parts of the vibration sensor of this invention is adapted to be securely yet removably attached to the metallic frame 2 (schematically shown) of a motor vehicle, near the front wheels thereof, by means of a permanent magnet 3 one end of which is secured (e.g., adhesively) to the housing 1. The magnet 3 may for example be hollow cylindrical in shape, with one or more pairs of N-S magnetic poles provided at its free end. In this connection, it is desired to be pointed out that, typically, the vibrations to be sensed are those set up as a result of rotational unbalance of the front wheels of a motor vehicle; such vibrations occur at a low frequency rate when the wheels are rotating, a rate on the order of seven to fifteen cycles per second, for example. Mechanical vibrations which are set up in the frame 2 as a result of such wheel unbalance are transmitted through the magnet 3 to housing 1.

One face of a piece of sponge-like (foamed) material 4 is cemented to one of the interior walls of housing 1, and one face of a piezoelectric crystal pickup 5 is in turn cemented to the other face of support 4. The support 4 serves to attenuate high frequency vibrations or noise reaching housing 1, so that these high frequency vibrations are damped out and do not appreciably affect the crystal 5. However, low frequency vibrations (such as those resulting from wheel unbalance, previously mentioned) are transmitted substantially without attenuation through the high frequency damping support 4, and thus reach crystal 5 substantially undiminished.

One leg of a rigid Z-shaped bracket 6 (made of metal, for example) is securely attached (as by cementing) to the other face of crystal 5, and a mechanical frequency converter, indicated generally by numeral 7, is rigidly attached to the other leg of bracket 6. Frequency converter 7 functions to convert low frequency vibrations reaching the crystal to higher frequency vibrations, to which the crystal is more sensitive. Thus the low frequency wheel-unbalance-derived vibrations reaching the crystal are converted to higher frequency vibrations by the converter 7, and these higher frequency vibrations are effective on crystal 5. The converter 7 takes the form of a bell which, moved at a low frequency rate, produces compressional wave energy at its natural resonant frequency (which is within the audible range, much higher than 7–15 c.p.s.). This bell is preferably of the type widely used in the toy industry, comprising a hollow substantially spherical slotted cage 8 (with crossed slots 9) which contains a metallic ball 10 free to move within the cage.

As previously stated, the higher frequency (audio frequency) vibrations set up by the shaking of the bell at the low frequency (wheel unbalance) rate are effective on crystal 5, reaching this crystal through bracket 6 (which is attached to both the bell and the crystal). The piezoelectric crystal 5 converts these vibrations to an electrical signal (voltage). Opposite faces of crystal 5 are provided with electrodes, in the usual manner, and separate electrical leads 11 and 12 extend from the respective electrodes to contacts in an electrical receptacle 13 mounted in the wall of housing 1. A plug 14 mates with receptacle 13, and a pair of electrical leads 15 extend from this plug to the input of a suitable amplifier contained in a separate housing 16. The amplifier in housing 16 is preferably a small, light-weight, battery-operated amplifier having a meter 17 connected to its output; for example, this amplifier-meter unit may be of the type sold commercially under the trademark "Aud-O-Tek." This unit is provided with an earphone jack (not shown), into which earphones may be plugged when it is desired to listen to the amplified output of the crystal.

The voltage output of crystal 5 is fed by means of items 11–15 to the input of the amplifier, and the amplifier output is fed to meter 17. The meter provides an indication of the vibrations (originally at low frequency, but converted by converter 7 to higher frequency) effective on crystal 5, and thus of the low frequency vibrations set up in frame 2 as a result of wheel unbalance. The sensor of this invention has high sensitivity, due to the use of the frequency converter 7, acting to convert the low frequency (wheel-unbalance) vibrations to higher frequency vibrations, which are then applied to crystal 5.

The sensor is small, light-weight, simple, and therefore low in cost.

What is claimed is:

1. An electromechanical transducer for detecting low frequency mechanical vibrations comprising: a housing receptive of the mechanical vibrations; a piezoelectric crystal; a vibration-transmitting coupling for securing said crystal to said housing acting to attenuate high frequency vibrations received from said housing so that said high frequency vibrations are substantially prevented from reaching said crystal and acting to transmit to said crystal substantially without attenuation low frequency vibrations received from said housing; and a mechanical frequency converter coupled to said crystal but independent of said housing for converting low frequency vibrations received from said crystal to higher frequency vibrations, said crystal acting to change said higher frequency vibrations into an electrical output signal.

2. Transducer according to claim 1, wherein said frequency converter is a bell mounted on said crystal.

3. Transducer defined in claim 1, wherein said frequency converter comprises a hollow slotted cage attached to said crystal, and a ball contained in said cage for free movement relative thereto.

4. Transducer as set forth in claim 1, including also means for removably attaching said housing to a body carrying the mechanical vibrations to be detected.

5. Transducer defined in claim 4, wherein said means comprises a permanent magnet secured to said housing for cooperation with a ferromagnetic body carrying the mechanical vibrations.

6. Transducer according to claim 4, wherein said frequency converter is a bell mounted on said crystal.

References Cited

UNITED STATES PATENTS

| | | | |
|---|---|---|---|
| 2,849,629 | 8/1958 | Kissinger | 310—8.4 |
| 2,972,006 | 2/1961 | Shoor | 73—71.4 XR |
| 3,115,616 | 12/1963 | Parris. | |

JAMES J. GILL, Primary Examiner

JOHN R. FLANAGAN, Assistant Examiner